United States Patent
Ryowa

(10) Patent No.: US 8,153,022 B2
(45) Date of Patent: Apr. 10, 2012

(54) SEMICONDUCTOR PHOSPHOR NANOPARTICLE

(75) Inventor: Tatsuya Ryowa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/834,494

(22) Filed: Jul. 12, 2010

(65) Prior Publication Data

US 2011/0017951 A1    Jan. 27, 2011

(30) Foreign Application Priority Data

Jul. 27, 2009    (JP) ................................ 2009-174373

(51) Int. Cl.
*C09K 11/06* (2006.01)
*C09K 11/08* (2006.01)
*C09K 11/02* (2006.01)

(52) U.S. Cl. .............. 252/301.33; 252/301.36; 977/816; 977/830

(58) Field of Classification Search ............ 252/301.16, 252/301.33, 301.35, 301.36, 301.4 R, 301.31, 252/301.32, 301.6 R, 301.6 S; 977/773, 977/816, 817, 830; 428/403, 690
See application file for complete search history.

(56) References Cited

U.S. PATENT DOCUMENTS

| | | | |
|---|---|---|---|
| 7,267,875 B2 * | 9/2007 | Whiteford et al. ............ 428/402 |
| 7,892,452 B2 * | 2/2011 | Ryowa et al. .......... 252/301.4 R |
| 7,927,516 B2 * | 4/2011 | Strouse et al. .............. 252/519.1 |
| 2004/0033345 A1 * | 2/2004 | Dubertret et al. ............. 428/220 |
| 2008/0173845 A1 * | 7/2008 | Ryowa et al. ............. 252/301.36 |
| 2008/0213919 A1 * | 9/2008 | Naasani ........................ 436/525 |
| 2009/0247406 A1 * | 10/2009 | De Corte et al. ............. 504/189 |
| 2010/0068522 A1 * | 3/2010 | Pickett et al. ................. 428/402 |
| 2010/0163798 A1 * | 7/2010 | Ryowa et al. .......... 252/301.4 R |

FOREIGN PATENT DOCUMENTS

| | | |
|---|---|---|
| JP | 2004-307679 A | 11/2004 |
| JP | 2004307679 A * | 11/2004 |
| JP | 2007-77245 A | 3/2007 |
| JP | 2008-94968 A | 4/2008 |
| WO | WO 2007-111082 A1 | 10/2007 |

OTHER PUBLICATIONS

C.B. Murray et al., "Synthesis and Characterization of Nearly Monodisperse CdE (E=S, Se, Te) Semiconductor Nanocrystallites", J. Am. Chem. Soc., 1993, 115, pp. 8706-8715.

* cited by examiner

*Primary Examiner* — Jerry Lorengo
*Assistant Examiner* — Lynne Edmondson
(74) *Attorney, Agent, or Firm* — Birch, Stewart, Kolasch & Birch, LLP

(57) ABSTRACT

A semiconductor phosphor nanoparticle including nanoparticle core made of a group 13-group 15 semiconductor; a shell layer coating the semiconductor nanoparticle core; and a metal-containing modified organic compound and a modified organic compound binding to a surface of the shell layer is disclosed.

1 Claim, 3 Drawing Sheets

US 8,153,022 B2

SEMICONDUCTOR PHOSPHOR NANOPARTICLE

This nonprovisional application is based on Japanese Patent Application No. 2009-174373 filed on Jul. 27, 2009 with the Japan Patent Office, the entire contents of which are hereby incorporated by reference.

BACKGROUND OF THE INVENTION

1. Field of the Invention

The present invention relates to a semiconductor phosphor nanoparticle, and in particular, to a group 13-group 15 semiconductor phosphor nanoparticle having an improved luminous intensity and luminous efficiency.

2. Description of the Background Art

It is known that a semiconductor crystalline particle (hereinafter, referred to as "crystalline particle") having a particle size reduced to about exciton Bohr radius exhibits quantum size effect. Quantum size effect refers to a phenomenon that electrons in a substance are no longer able to move freely as the size of the substance decreases, and in such a condition, the energy of the electron is able to assume only specific, rather than arbitrary values.

C. B. Murray et al. (Journal of the American Chemical Society), 1993, 115, pp. 8706-8715 describes a phosphor using a crystalline particle of a group 12-group 16 compound semiconductor as a technique utilizing the quantum size effect. This crystalline particle has a size of generally exciton Bohr radius, and has a characteristic that a wavelength of light generated becomes short as the dimension decreases.

However, such a phosphor using a crystalline particle of a group 12-group 16 compound semiconductor is problematic in reliability and durability, and has a problem that environmental pollutants such as cadmium and selenium are used. Therefore, an alternative material to the group 12-group 16 compound semiconductor has been demanded.

As a material alternative to the group 12-group 16 compound semiconductor, an attempt is made to synthesize a microcrystal of a nitride-based semiconductor. For example, Japanese Patent Laying-Open No. 2004-307679 discloses a phosphor nanoparticle material of a group 13 nitride semiconductor having a core-shell structure wherein an energy condition of a semiconductor nanoparticle surface is stabilized and thus a luminous efficiency is improved by coating the semiconductor nanoparticle with a compound having a larger band gap energy than the semiconductor nanoparticle. Japanese Patent Laying-Open No. 2004-307679 proposes a technique of improving dispersibility by protecting a surface of the core-shell structure with an organic compound.

However, since there are a dangling-bond (unbound hand) and a surface defect in the outermost face of a semiconductor crystalline particle, a phosphor exhibiting an excellent luminous efficiency cannot be obtained only by protecting a core with a shell layer in a core-shell structure of a semiconductor crystalline particle. This also applies to a case where the shell layer has a laminate structure, or a case where a surface of the shell layer is protected with an organic compound.

SUMMARY OF THE INVENTION

In light of the above circumstances, the present invention aims at providing a semiconductor phosphor nanoparticle having a high luminous efficiency and excellent in reliability.

The present invention relates to a semiconductor phosphor nanoparticle including: a nanoparticle core made of a group 13-group 15 compound semiconductor; a shell layer coating the semiconductor nanoparticle core; and a metal-containing modified organic compound and a modified organic compound binding to a surface of the shell layer.

In the semiconductor phosphor nanoparticle of the present invention, the metal-containing modified organic compound preferably has a linear alkyl group.

In the semiconductor phosphor nanoparticle of the present invention, the metal-containing modified organic compound preferably has a hetero atom.

In the semiconductor phosphor nanoparticle of the present invention, the metal-containing modified organic compound is preferably a fatty acid salt.

In the semiconductor phosphor nanoparticle of the present invention, a metal contained in the metal-containing modified organic compound and a metal contained in the shell layer are desirably identical metals.

In the semiconductor phosphor nanoparticle of the present invention, the modified organic compound preferably has a hetero atom.

In the semiconductor phosphor nanoparticle of the present invention, the modified organic compound preferably has a linear alkyl group.

In the semiconductor phosphor nanoparticle of the present invention, the modified organic compound is preferably amine.

In the semiconductor phosphor nanoparticle of the present invention, a particle diameter of the nanoparticle core is preferably twice or less the Bohr radius.

In the semiconductor phosphor nanoparticle of the present invention, the shell layer preferably has a laminate structure made of a plurality of shell films.

According to the present invention, since the metal-containing modified organic compound and the modified organic compound are bound to the surface of the shell layer that coats the core of the group 13-group 15 semiconductor nanoparticle, it is possible to cap a surface defect in the shell layer surface with the metal-containing modified organic compound and the modified organic compound. As a result, inactivation of an excitation energy in the shell layer surface can be suppressed, so that a semiconductor phosphor nanoparticle having a high luminous efficiency and excellent in reliability can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
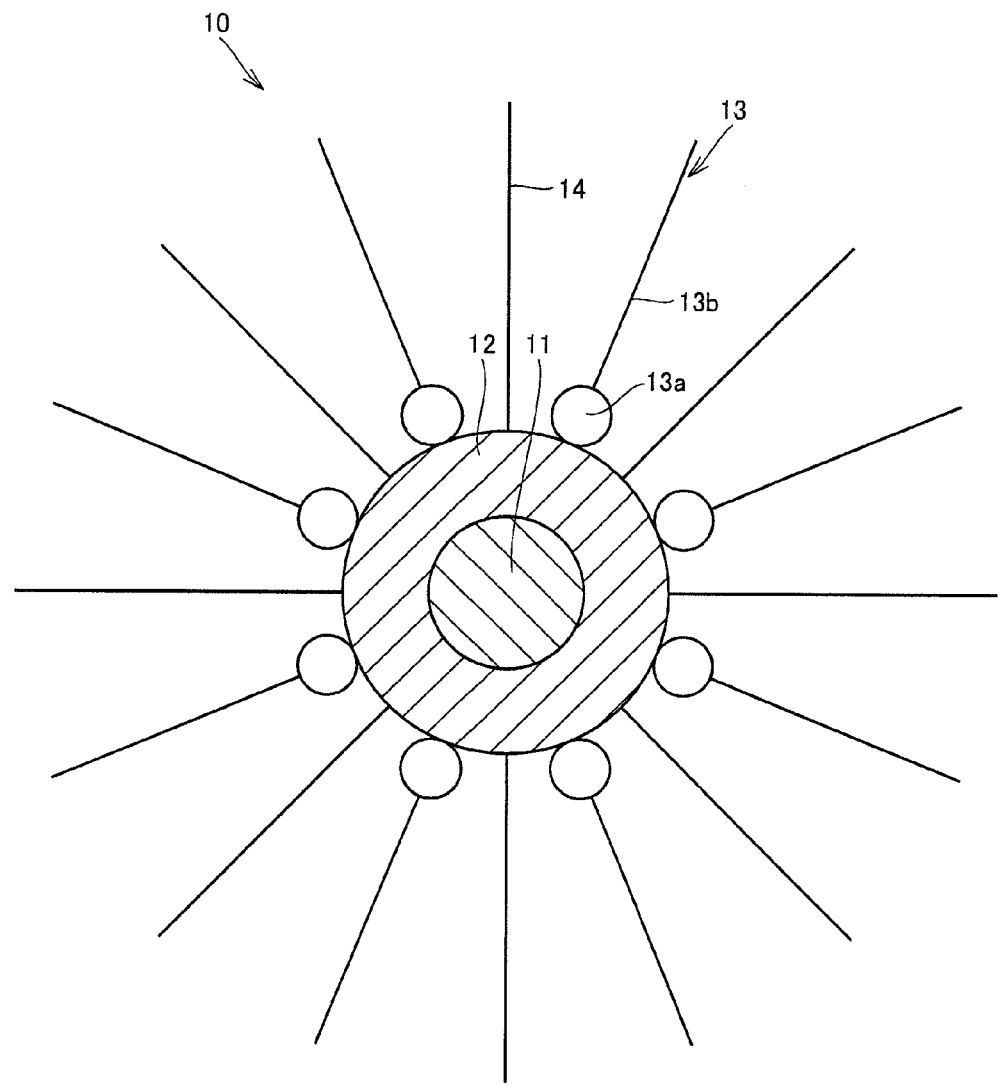
FIG. 1 is a section view schematically showing a basic structure of a semiconductor phosphor nanoparticle according to one embodiment of the present invention.

In the following, embodiments of the present invention will be described based on drawings. Dimensional relations such as a length, a size and a width in the drawings are appropriately changed for clarification and simplification of the drawings, and do not show the actual dimensions.

<Basic Structure of Semiconductor Phosphor Nanoparticle>

In FIG. 1, a semiconductor phosphor nanoparticle 10 includes a nanoparticle core 11, a shell layer 12 coating nanoparticle core 11, a metal-containing modified organic compound 13 and a modified organic compound 14 bound to a surface of shell layer 12. In the following, these elements making up semiconductor phosphor nanoparticle 10 will be described.

<<Semiconductor Nanoparticle Core>>

Nanoparticle core 11 that is a crystal particle is a nanoparticle made of a group 13-group 15 semiconductor. More concretely, it is made of a semiconductor where a group 13 element (B, Al, Ga, In, Tl) and a group 15 element (N, P, As, Sb, Bi) are bound.

A composition of a semiconductor constituting nanoparticle core 11 is preferably at least one selected from the group consisting of InN, InP, InGaN, InGaP, AlInN, AlInP, AlGaInN, and AlGaInP. Particularly preferably, it is at least one selected from InN, InP, InGaN, and InGaP. Since the semiconductor having such a composition has a band gap energy generating visible luminescence, it is possible to form nanoparticle core 11 allowing arbitrary visible luminescence by controlling a particle size and a mixed crystal ratio.

Nanoparticle core 11 may contain unintended impurities, and may be intentionally added with at least any one of a group 2 element (Be, Mg, Ca, Sr, Ba), Zn and Si as a dopant at a low concentration. A concentration of the dopant in nanoparticle core 11 is preferably $1\times10^{16}$ to $1\times10^{21}$ $cm^{-3}$, and the kind of the dopant is preferably Mg, Zn or Si.

A band gap of nanoparticle core 11 is preferably in a range of 1.8 to 2.8 eV. Concretely, when semiconductor phosphor nanoparticle 10 is used as a red phosphor, the band gap of nanoparticle core 11 is preferably in a range of 1.85 to 2.5 eV. When semiconductor phosphor nanoparticle 10 is used as a green phosphor, the band gap of nanoparticle core 11 is preferably in a range of 2.3 to 2.5 eV. When semiconductor phosphor nanoparticle 10 is used as a blue phosphor, the band gap of nanoparticle core 11 is preferably falls in a range of 2.65 to 2.8 eV.

A particle diameter of nanoparticle core 11 is preferably in a range of 0.1 to 100 nm, particularly preferably in a range of 0.5 to 50 nm, and further preferably in a range of 1 to 20 nm. When the particle diameter of nanoparticle core 11 falls within the above range, scattering of the excitation light at a superficial layer of nanoparticle core 11 is suppressed, so that the excitation light is efficiently absorbed in nanoparticle core 11.

Further, the particle diameter of nanoparticle core 11 is preferably twice or less the exciton Bohr radius. Bohr radius represents extension of existence probability of an exciton, and is expressed by Mathematical formula (1). For example, the exciton Bohr radius of GaN is about 3 nm, and the exciton Bohr radius of InN is about 7 nm.

$$y=4\pi\in h^2 \cdot me^2 \quad \text{(Mathematical formula (1))}$$

Here,
y: Bohr radius
∈: Dielectric constant
h: Planck's constant
m: Effective mass
e: Elementary electric charge.

When the particle diameter of nanoparticle core 11 is twice or less the exciton Bohr radius, it is possible to extremely improve a luminous intensity of semiconductor phosphor nanoparticle 10. Here, when nanoparticle core 11 is used as a phosphor, an optical band gap tends to extend due to quantum size effect when the particle diameter is twice or less the exciton Bohr radius, however, even in such a case, the band gap of the nanoparticle core is preferably within the aforementioned range.

A mean particle diameter of nanoparticle core 11 according to the present embodiment can be estimated as 2 to 6 nm from a spectrum half-value width by X-ray diffraction measurement. The particle diameter of nanoparticle core 11 can also be estimated by examining a lattice image in an image observed at high magnification in TEM (transmission electron microscope) observation.

<<Shell Layer>>

Shell layer 12 is composed of a semiconductor, and more concretely, of a compound semiconductor formed while taking over a crystal structure of the semiconductor nanoparticle core. That is, shell layer 12 is a layer formed by growth of a semiconductor crystal on a surface of semiconductor nanoparticle core 11, and nanoparticle core 11 and shell layer 12 are bound to each other via a chemical bond.

A composition of the semiconductor forming shell layer 12 is a group 13-group 15 semiconductor, or a group 12-group 16 semiconductor. Preferably it is at least one selected from the group consisting of GaAs, GaP, GaN, GaSb, InAs, InP, InN, InSb, AlAs, AlP, AlSb, MN, ZnO, ZnS, ZnSe and ZnTe, for example.

Also as described above, in correspondence with nanoparticle core 11 having an estimated particle diameter of 2 to 6 nm, a thickness of shell layer 12 is preferably within a range of 0.1 to 10 nm. When the thickness of shell layer 12 is 0.1 nm or more, the surface of nanoparticle core 11 can be sufficiently coated, and a uniform protective layer can be formed. On the other hand, when the thickness of shell layer 12 is 10 nm or less, the thickness of shell layer 12 can be readily made uniform, and occurrence of a defect can be suppressed. This is also preferred in respect of cost.

Here, the thickness of shell layer 12 may be measured by X-ray diffraction, and may be estimated also by examining a lattice image in an image observed at high magnification in TEM observation. The thickness of shell layer 12 is proportional to a mixing ratio between a particle number of nanoparticle core 11 and a particle number of shell layer 12.

Also, a structure of shell layer 12 may be a laminate structure composed of a plurality of shell films. In this case, a thickness of the laminate structure is proportional to a mixing ratio between the particle number of nanoparticle core 11 and a particle number constituting the laminate structure. Shell layer 12 having a laminate structure enables to ensure coating of nanoparticle core 11.

<<Metal-Containing Modified Organic Compound>>

A metal-containing modified organic compound 13 is defined as a compound having a metal element, a hydrophilic group and a hydrophobic group in a molecule. In FIG. 1, metal-containing modified organic compound 13 consists of a metal 13a and an organic compound 13b, and organic compound 13b has a hydrophilic group and a hydrophobic group.

As to metal-containing modified organic compound 13, metal 13a securely bonds to a group 15 element or a group 16 element in the surface of shell layer 12. In this manner, since a surface defect in shell layer 12 is suppressed by capping a dangling bond (unbound hand) in the surface of shell layer 12 with metal-containing modified organic compound 13, a luminous efficiency of nanoparticle core 11 is improved.

As metal 13a constituting metal-containing modified organic compound 13, gallium, indium, zinc and the like are recited. In particular, metal 13a is preferably the same metal element as that contained in shell layer 12. In this case, metal 13a is able to bind strongly to a group 15 element or a group 16 element in the surface of shell layer 12 likewise a strong bond between a group 12 element and a group 16 element, or a strong bond between a group 13 element and a group 15 element, in shell layer 12.

As organic compound 13b constituting metal-containing modified organic compound 13, a fatty acid salt, sulfate or phosphate of a group 13 element or a group 12 element, and organic compounds including a nitrogen-containing functional group, a sulfur-containing functional group, an acidic group, an amide group, a phosphine group, a phosphine oxide group, a hydroxyl group or the like containing a group 13 element or a group 12 element are recited.

In particular, organic compound 13b is preferably a linear alkyl group, and more preferably has a hetero atom. Organic compound 13b having a linear alkyl group makes it possible to suppress steric obstruction among metal-containing modified organic compound 13 in binding to the surface of shell layer 12. Also organic compound 13b having a hetero atom allows strong binding of metal-containing modified organic compound 13 to the surface of shell layer 12. As a linear alkyl group, for example, a fatty acid salt is preferred. When the linear alkyl of metal-containing modified organic compound 13 is a fatty acid salt, binding between metal 13a and organic compound 13b is strengthened, and binding between shell layer 12 and metal-containing modified organic compound 13 is also strengthened. Therefore, a structure of semiconductor phosphor nanoparticle 10 is stabilized.

Concretely, gallium acetyl acetonate, indium acetyl acetonate, gallium stearate, indium stearate, zinc stearate, gallium palmitate, indium palmitate, zinc palmitate, gallium myristate, indium myristate, zinc myristate, gallium laurate, indium laurate, zinc laurate, gallium undecylenate, indium undecylenate, zinc undecylenate, gallium stearyl sulfate, indium stearyl sulfate, gallium palmityl sulfate, indium palmityl sulfate, zinc palmityl sulfate, zinc stearyl sulfate, gallium myristyl sulfate, indium myristyl sulfate, zinc myristyl sulfate, gallium lauryl sulfate, indium lauryl sulfate, zinc lauryl sulfate, gallium stearyl phosphate, indium stearyl phosphate, zinc stearyl phosphate, gallium palmityl phosphate, indium palmityl phosphate, zinc palmityl phosphate, gallium myristyl phosphate, indium myristyl phosphate, zinc myristyl phosphate, gallium lauryl phosphate, indium lauryl phosphate, zinc lauryl phosphate and so on may be used as metal-containing modified organic compound 13.

A thickness of metal-containing modified organic compound 13 binding to shell layer 12 may be estimated by examining an image observed at high magnification in TEM observation as is the case with the particle diameter of nanoparticle core 11 and the respective thickness of shell layer 12.

<<Modified Organic Compound>>

Modified organic compound 14 is defined as a compound having a hydrophilic group and a hydrophobic group in a molecule, and strongly binds to a group 12 element or a group 13 element in the surface of shell layer 12. In this manner, since a surface defect in shell layer 12 is suppressed by capping the dangling bond (unbound hand) in the surface of shell layer 12 with modified organic compound 14, a luminous efficiency of nanoparticle core 11 is improved.

As modified organic compound 14, organic compounds including a nitrogen-containing functional group, a sulfur-containing functional group, an acidic group, an amide group, a phosphine group, a phosphine oxide group, a hydroxyl group and so on are recited. Concretely, triethanolamine lauryl sulfate, lauryl diethanol amide, dodecyltrimethylammonium chloride, trioctyl phosphine, trioctyl phosphine oxide and so on may be used as modified organic compound 14.

In particular, modified organic compound 14 preferably has a linear alkyl group, and more preferably has a hetero atom. Since modified organic compound 14 has a linear alkyl group, it is possible to suppress steric obstruction between modified organic compound 14 in binding to the surface of shell layer 12. Also modified organic compound 14 having a hetero atom allows strong binding of modified organic compound 14 to the surface of shell layer 12. Modified organic compound 14 is preferably amine that is a compound having a nonpolar hydrocarbon terminal as a hydrophobic group, and an amino group as a hydrophilic group. When the hydrophilic group of modified organic compound 14 is amine, the amine is able to bind strongly to a metal element in the surface of shell layer 12.

Concretely, butylamine, t-butylamine, isobutylamine, tri-n-butylamine, triisobutylamine, triethylamine, diethylamine, hexylamine, dimethylamine, laurylamine, octylamine, tetradecylamine, hexadecylamine, oleylamine, tripentylamine, trihexylamine, triheptylamine, trioctylamine, trinonylamine, tridecylamine, triundecylamine and the like may be used as modified organic compound 14.

A thickness of modified organic compound 14 binding to shell layer 12 may be estimated by examining an image observed at high magnification in TEM observation as is the case with the thickness of metal-containing modified organic compound 13.

<Luminescence of Semiconductor Phosphor Nanoparticle>

In semiconductor phosphor nanoparticle 10, metal-containing modified organic compound 13 and modified organic compound 14 bind to a group 15 element and a group 13 element having unbound hands arranged in the surface of shell layer 12. Concretely, metal 13a of metal-containing modified organic compound 13 strongly binds to a group 15 element or a group 16 element in the surface of shell layer 12, and modified organic compound 14 strongly binds to a group 13 element or a group 12 element in the surface of shell layer 12. With this configuration, dangling bonds (unbound hands) of shell layer 12 are efficiently capped.

When semiconductor phosphor nanoparticle 10 having such a semiconductor core-shell structure is irradiated with excitation light, nanoparticle core 11 absorbs the excitation light and an excitation carrier is generated. Here, since the particle diameter of nanoparticle core 11 is so small that quantum size effect is achieved, particle core 11 can be at a plurality of scattered energy levels, or may be at one level. In nanoparticle core 11, the excitation carrier transits between a ground level of a conduction band and a ground level of a valence band, and light of the wavelength corresponding to that energy is emitted from particle core 11.

According to semiconductor phosphor nanoparticle 10 of the above-described embodiment, a surface defect of shell layer 12 is suppressed because the dangling bond (unbound hand) in the surface of shell layer 12 is capped with metal-containing modified organic compound 13 and modified organic compound 14. As a result, shell layer 12 is able to have high confinement effect of the excitation carrier generated in nanoparticle core 11, and thus is able to suppress inactivation of an excitation energy in the shell layer surface, so that it is possible to provide a semiconductor phosphor nanoparticle having a high luminous efficiency and excellent in reliability.

Also by repulsion power generated between metal-containing modified organic compound 13 and modified organic compound 14 by coating the surface of shell layer 12 uniformly with metal-containing modified organic compound 13 and modified organic compound 14, semiconductor phosphor nanoparticles will not be aggregated, so that highly-dispersed semiconductor phosphor nanoparticles can be provided. Also by binding of metal-containing modified organic compound 13 and modified organic compound 14 to the surface of the shell layer, the particle diameter of semiconductor phosphor nanoparticle 10 is controlled, and thus semiconductor phosphor nanoparticles having a uniform size can be provided.

<Production Method of Semiconductor Phosphor Nanoparticle>

In the present invention, while a production method of a semiconductor phosphor nanoparticle is not particularly limited, a chemical synthesis method including dispersing a plurality of starting substances including a constituting element of a product substance in a medium, and allowing these to react, thereby obtaining an objective product substance is preferred because of its simplicity and low cost. Such a chemical synthesis method includes a sol gel method (colloid method), a hot soap method, a reversed micelle method, a solvothermal method, a molecular precursor method, a hydrothermal synthetic method, a flux method and so on.

In the following, a production method of a semiconductor phosphor nanoparticle 10 according to the present embodiment will be described. Here, a hot soap method suited for production of a nanoparticle of a compound semiconductor material will be described.

First, nanoparticle core 11 is synthesized in a liquid-phase. Taking nanoparticle core 11 composed of InN as an example, a flask or the like is filled with 1-octadecene as a solvent, and tris(dimethylamino)indium and hexadecylamine (HDA) are mixed therein. After sufficiently stirring, reaction is allowed at a synthesis temperature of 180 to 500° C. In this method, in principle, a core size increases as a reaction time increases. Therefore, by monitoring the core size by photoluminescence, light absorption, dynamic light scattering or the like, it is possible to control nanoparticle core 11 composed of InN to a desired size.

Next, to a solution containing nanoparticle core 11 as described above is added a reaction reagent that is a raw material of shell layer 12 and modified organic compound 14 and allowed to react under heating. Further, metal-containing modified organic compound 13 is added and allowed to react under heating. In this step, a crystal of the raw material of shell layer 12 grows while it takes over a crystal structure of nanoparticle core 11, and thus shell layer 12 is synthesized. At the same time, metal-containing modified organic compound 13 and modified organic compound 14 chemically bind to the surface of shell layer 12.

Thus, a semiconductor phosphor nanoparticle where surface defects such as dangling bonds in the surface of shell layer 12 are capped is produced. Metal-containing modified organic compound 13 and modified organic compound 14 may be added into a solution after growth of shell layer 12.

In the above production invention, as a synthesis solvent, a compound solution consisting exclusively of a carbon atom and a hydrogen atom (hereinafter, referred to as "hydrocarbon solvent") is used. This is because if a solvent other than the hydrocarbon solvent is used as a synthesis solvent, water and oxygen will enter the synthesis solvent, and nanoparticle core 11 or the like will be oxidized. Examples of the hydrocarbon solvent include n-pentane, n-hexane, n-heptane, n-octane, cyclopentane, cyclohexane, cycloheptane, benzene, toluene, o-xylene, m-xylene, p-xylene and so on.

EXAMPLES

Example 1

In Example 1, a semiconductor phosphor nanoparticle as a red phosphor that absorbs excitation light and emits red light was fabricated. Concretely, a semiconductor phosphor nanoparticle including a nanoparticle core made of InN having a particle diameter of 5 nm, a shell layer made of GaN, a metal-containing modified organic compound made of gallium acetyl acetonate (Ga(acac)3), and a modified organic compound of hexadecylamine (HDA) was fabricated.

As a production method, a hot soap method was used. Concretely, first 1 mmol of tris(dimethylamino)indium was allowed for thermal decomposition reaction in 30 mL of 1-octadecene solution containing 2 mmol of HDA, to synthesize a nanoparticle core made of InN. Next, to this solution was added 30 mL of 1-octadecene solution containing 7 mmol of tris(dimethylamino)gallium that is a raw material of a shell layer and allowed to react. Further, 3.5 mmol of Ga(acac)3 was added and allowed to react, to produce a semiconductor phosphor nanoparticle having a composition of InN (nanoparticle core)/GaN (shell layer)/Ga(acac)3 (metal-containing modified organic compound), HDA (modified organic compound).

In the present specification, the notation "A/B" represents a composition that A is coated with B. The notation "A/B, C" represents a composition that A is coated with B and C. The notation "A/B/C" represents a composition that A is coated with B, and further B is coated with C.

This semiconductor phosphor nanoparticle was able to use a blue light emitting device composed of a group 13 nitride as an excitation light source, and was able to efficiently absorb luminescence at 405 nm showing a particularly high external quantum efficiency. Since a particle diameter of an InN crystal that constitutes the nanoparticle core is adjusted so that a luminous wavelength is 620 nm, red luminescence could be exhibited.

Example 2

In Example 2, a semiconductor phosphor nanoparticle as a green phosphor that absorbs excitation light and emits green light was fabricated. Concretely, a semiconductor phosphor nanoparticle including a nanoparticle core made of InN having a particle diameter of 4 nm, a shell layer made of GaN, a metal-containing modified organic compound made of In(acac)3, and a modified organic compound made of oleylamine (OA) was fabricated.

As a production method, a hot soap method was used similarly to Example 1. Concretely, first 1 mmol of tris(dimethylamino)indium was allowed for thermal decomposition reaction in 30 mL of 1-octadecene solution containing 3 mmol of OA, to synthesize a nanoparticle core made of InN. Next, to this solution was added 30 mL of 1-octadecene solution containing 5 mmol of tris(dimethylamino)gallium that is a raw material of a shell layer and allowed to react. Further, 2.5 mmol of In(acac)3 was added and allowed to react, to produce a semiconductor phosphor nanoparticle having a composition of InN (nanoparticle core)/GaN (shell layer)/In(acac)3 (metal-containing modified organic compound), OA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an InN crystal that constitutes the nanoparticle core is adjusted so that a luminous wavelength is 520 nm, green luminescence could be exhibited.

Example 3

In Example 3, a semiconductor phosphor nanoparticle as a blue phosphor that absorbs excitation light and emits blue light was fabricated. Concretely, a semiconductor phosphor nanoparticle including a nanoparticle core made of InN having a particle diameter of 3 nm, a shell layer made of GaN, a metal-containing modified organic compound made of zinc undecylenate (Zn(UNA)2), and a modified organic compound made of HDA was fabricated.

As a production method, a hot soap method was used similarly to Example 1. Concretely, first 1 mmol of tris(dimethylamino)indium was allowed for thermal decomposition reaction in 30 mL of 1-octadecene solution containing 4 mmol of HDA, to synthesize a nanoparticle core made of InN. Next, to this solution was added 30 mL of 1-octadecene solution containing 3 mmol of tris(dimethylamino)gallium that is a raw material of a shell layer and allowed to react. Further, 1.5 mmol of Zn(UNA)2 was added and allowed to react, to produce a semiconductor phosphor nanoparticle having a composition of InN (nanoparticle core)/GaN (shell layer)/Zn(UNA)2 (metal-containing modified organic compound), HDA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an InN crystal that constitutes the nanoparticle core is adjusted so that a luminous wavelength is 470 nm, blue luminescence could be exhibited.

Example 4

In Example 4, a semiconductor phosphor nanoparticle as a red phosphor was fabricated. Concretely, a semiconductor phosphor nanoparticle including a nanoparticle core made of InN having a particle diameter of 5 nm, a shell layer made of ZnS, a metal-containing modified organic compound made of Zn(UNA)2, and a modified organic compound made of HDA was fabricated.

As a production method, a hot soap method was used similarly to Example 1. Concretely, first 1 mmol of tris(dimethylamino)indium was subjected to thermal decomposition reaction in 30 mL of 1-octadecene solution containing 2 mmol of HDA, to synthesize a nanoparticle core made of InN. Next, to this solution was added 30 mL of 1-octadecene solution containing 7 mmol of zinc acetate and 7 mmol of sulfur which are raw materials of a shell layer and allowed to react. Further, 3.5 mmol of Zn(UNA)2 was added and allowed to react, to produce a semiconductor phosphor nanoparticle having a composition of InN (nanoparticle core)/ZnS (shell layer)/Zn(UNA)2 (metal-containing modified organic compound), HDA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an InN crystal that constitutes the nanoparticle core is adjusted so that a luminous wavelength is 620 nm, red luminescence could be exhibited.

Example 5

In Example 5, a semiconductor phosphor nanoparticle as a blue phosphor was fabricated. Concretely, a semiconductor phosphor nanoparticle including a nanoparticle core made of $In_{0.3}Ga_{0.7}N$ having a particle diameter of 5 nm, a shell layer made of GaN, a metal-containing modified organic compound of gallium myristyl sulfate (Ga(MS)3), and a modified organic compound made of oleylamine (OA) was fabricated.

As a production method, a hot soap method was used similarly to Example 1. Concretely, first 0.3 mmol of tris (dimethylamino)indium and 0.7 mmol of tris(dimethylamino)gallium were allowed for thermal decomposition reaction in 30 mL of 1-octadecene solution containing 2 mmol of OA, to synthesize a nanoparticle core made of $In_{0.3}Ga_{0.7}N$. Next, to this solution was added 30 mL of 1-octadecene solution containing 7 mmol of tris(dimethylamino)gallium that is a raw material of a shell layer and allowed to react. Further, 3.5 mmol of Ga(MS)3 was added and allowed to react, to produce a semiconductor phosphor nanoparticle having a composition of $In_{0.3}Ga_{0.7}N$ (nanoparticle core)/GaN (shell layer)/Ga(MS) 3(metal-containing modified organic compound), OA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an $In_{0.3}Ga_{0.7}N$ crystal that constitutes the nanoparticle core is adjusted so that a luminous wavelength is 480 nm, blue luminescence could be exhibited.

Example 6

In Example 6, a semiconductor phosphor nanoparticle as a green phosphor was fabricated. Concretely, a semiconductor phosphor nanoparticle including a nanoparticle core made of $In_{0.4}Ga_{0.6}N$ having a particle diameter of 5 nm, a shell layer made of ZnS, a metal-containing modified organic compound made of gallium palmityl phosphate (Ga(PP)3), and a modified organic compound made of HDA was fabricated.

As a production method, a hot soap method was used similarly to Example 1. Concretely, first 0.4 mmol of tris (dimethylamino)indium and 0.6 mmol of tris(dimethylamino)gallium were allowed for thermal decomposition reaction in 30 mL of 1-octadecene solution containing 2 mmol of HDA, to synthesize a nanoparticle core made of $In_{0.4}Ga_{0.6}N$. Next, to this solution was added 30 mL of 1-octadecene solution containing 7 mmol of zinc acetate and 7 mmol of sulfur which are raw materials of a shell layer and allowed to react. Further, 3.5 mmol of Ga(PP)3 was added and allowed to react, to produce a semiconductor phosphor nanoparticle having a composition of $In_{0.4}Ga_{0.6}N$ (nanoparticle core)/GaN (shell layer)/Ga(PP)3 (metal-containing modified organic compound), HDA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an $In_{0.4}Ga_{0.6}N$ crystal that constitutes the nanoparticle core is adjusted so that a luminous wavelength is 520 nm, green luminescence could be exhibited.

Example 7

In Example 7, a semiconductor phosphor nanoparticle as a red phosphor was fabricated. Concretely, a semiconductor phosphor nanoparticle including a nanoparticle core made of InP having a particle diameter of 3 nm, a shell layer made of GaN, a metal-containing modified organic compound made of zinc lauryl sulfate (Zn(RS)2), and a modified organic compound made of OA was fabricated.

As a production method, a hot soap method was used similarly to Example 1. Concretely, first 1 mmol of indium trichloride and 1 mmol of tris(trimethylsilylphosphine) were allowed for thermal decomposition reaction in 30 mL of 1-octadecene solution containing 4 mmol of OA, to synthesize a nanoparticle core made of InP. Next, to this solution was added 30 mL of 1-octadecene solution containing 3 mmol of tris(dimethylamino)gallium that is a raw material of a shell layer and allowed to react. Further, 1.5 mmol of Zn(RS)2 was added and allowed to react, to produce a semiconductor phosphor nanoparticle having a composition of InP (nanoparticle core)/ZnS (shell layer)/Zn(RS)2 (metal-containing modified organic compound), OA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an InP crystal that constitutes the nanoparticle core is adjusted so that a luminous wavelength is 650 nm, red luminescence could be exhibited.

Example 8

In Example 8, a semiconductor phosphor nanoparticle as a green phosphor was fabricated. Concretely, a semiconductor phosphor nanoparticle including a nanoparticle core made of InP having a particle diameter of 2 nm, a shell layer made of ZnS, a metal-containing modified organic compound made of Zn(UNA)2), and a modified organic compound made of HDA was fabricated.

As a production method, a hot soap method was used similarly to Example 1. Concretely, first 1 mmol of indium trichloride and 1 mmol of tris(trimethylsilylphosphine) were allowed for thermal decomposition reaction in 30 mL of 1-octadecene solution containing 5 mmol of HDA, to synthesize a nanoparticle core made of InP. Next, to this solution was added 30 mL of 1-octadecene solution containing 1.6 mmol of zinc acetate and 1.6 mmol of sulfur which are raw materials of a shell layer and allowed to react. Further, 0.8 mmol of Zn(UNA)2 was added and allowed to react, to produce a semiconductor phosphor nanoparticle having a composition of InP (nanoparticle core)/ZnS (shell layer)/Zn(UN)2 (metal-containing modified organic compound), HDA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an InP crystal that constitutes the nanoparticle core is adjusted so that a luminous wavelength is 520 nm, green luminescence could be exhibited.

Example 9

In Example 9, a semiconductor phosphor nanoparticle as a red phosphor was fabricated. Concretely, a semiconductor phosphor nanoparticle including a nanoparticle core made of $In_{0.7}Ga_{0.3}P$ having a particle diameter of 3 nm, a shell layer made of GaN, a metal-containing modified organic compound made of indium stearyl phosphate (In(SP)3), and a modified organic compound made of HDA was fabricated.

As a production method, a hot soap method was used similarly to Example 1. Concretely, first 0.7 mmol of indium trichloride, 0.3 mmol of gallium trichloride, and 1 mmol of tris(trimethylsilylphosphine) were allowed for thermal decomposition reaction in 30 mL of 1-octadecene solution containing 4 mmol of HDA, to synthesize a nanoparticle core made of $In_{0.7}Ga_{0.3}P$. Next, to this solution was added 30 mL of 1-octadecene solution containing 3 mmol of tris(dimethylamino)gallium that is a raw material of a shell layer and allowed to react. Further, 1.5 mmol of In(SP)3 was added and allowed to react, to produce a semiconductor phosphor nanoparticle having a composition of $In_{0.7}Ga_{0.3}P$ (nanoparticle core)/GaN (shell layer)/In(SP)3 (metal-containing modified organic compound), HDA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an $In_{0.7}Ga_{0.3}P$ crystal that constitutes the core is adjusted so that a luminous wavelength is 600 nm, red luminescence could be exhibited.

Example 10

In Example 10, a semiconductor phosphor nanoparticle as a red phosphor was fabricated. Concretely, a semiconductor phosphor nanoparticle including a nanoparticle core made of $In_{0.7}Ga_{0.3}P$ having a particle diameter of 3 nm, a shell layer made of GaN, a metal-containing modified organic compound made of indium myristyl sulfate (In(MS)3), and a modified organic compound made of OA was fabricated.

As a production method, a hot soap method was used similarly to Example 1. Concretely, first 0.7 mmol of indium trichloride, 0.3 mmol of gallium trichloride, and 1 mmol of tris(trimethylsilylphosphine) were allowed for thermal decomposition reaction in 30 mL of 1-octadecene solution containing 4 mmol of OA, to synthesize a nanoparticle core made of $In_{0.7}Ga_{0.3}P$. Next, to this solution was added 30 mL of 1-octadecene solution containing 3 mmol of zinc acetate and 3 mmol of sulfur which are raw materials of a shell layer and allowed to react. Further, 1.5 mmol of In(MS)3 was added and allowed to react, to produce a semiconductor phosphor nanoparticle having a composition of $In_{0.7}Ga_{0.3}P$ (nanoparticle core)/ZnS (shell layer)/In(MS)3 (metal-containing modified organic compound), OA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an $In_{0.7}Ga_{0.3}P$ crystal that constitutes the nanoparticle core is adjusted so that a luminous wavelength is 600 nm, red luminescence could be exhibited.

Example 11

In Example 11, a semiconductor phosphor nanoparticle as a red phosphor was fabricated. Concretely, a semiconductor phosphor nanoparticle including a nanoparticle core made of InN having a particle diameter of 5 nm, a shell layer having a laminate structure where GaN and ZnS are laminated, a metal-containing modified organic compound of Zn(UNA)2, and a modified organic compound of HDA was fabricated. In the shell layer, the GaN layer constituted a first shell that is an inner shell, and ZnS constituted a second shell that is an outer shell.

As a production method, a hot soap method was used similarly to Example 1. Concretely, first 1 mmol of tris(dimethylamino)indium was allowed for thermal decomposition reaction in 30 mL of 1-octadecene solution containing 2 mmol of HDA, to synthesize a nanoparticle core made of InN. Next, to this solution was added 30 mL of 1-octadecene solution containing 7 mmol of tris(dimethylamino)gallium that is a raw material of the first shell and allowed to react. Further, 30 mL of 1-octadecene solution containing 7 mmol of zinc acetate and 7 mmol of sulfur which are raw materials of the second shell was added and allowed to react. Then, to the result solution was further added 1-octadecene solution containing 3.5 mmol of Zn(UNA)2 and allowed to react, to produce a semiconductor phosphor nanoparticle having a composition of InN (nanoparticle core)/GaN (first shell)/ZnS (second shell)/Zn(UNA)2 (metal-containing modified organic compound), HDA (modified organic compound).

This semiconductor phosphor nanoparticle was able to use a blue light emitting device made of a group 13 nitride as an excitation light source, and was able to efficiently absorb luminescence at 405 nm showing a particularly high external quantum efficiency. Since a particle diameter of an InN crystal that constitutes the nanoparticle core is adjusted so that a luminous wavelength is 620 nm, red luminescence could be exhibited.

Comparative Example 1

In Comparative Example 1, a semiconductor phosphor nanoparticle as a red phosphor was fabricated. Concretely, a semiconductor phosphor nanoparticle including a nanoparticle core made of InN having a particle diameter of 5 nm, a shell layer made of GaN, and a modified organic compound made of hexadecylamine was fabricated.

As a production method, a hot soap method was used similarly to Example 1. Concretely, first 1 mmol of tris(dimethylamino)indium was allowed for thermal decomposition reaction in 30 mL of 1-octadecene solution containing 2 mmol of HDA, to synthesize a nanoparticle core of InN. Next, to this solution was further added 30 mL of 1-octadecene solution containing 7 mmol of tris(dimethylamino)gallium and 3.5 mmol of HDA which are raw materials of a shell layer, and allowed to react, to give a semiconductor phosphor nanoparticle having a composition of InN (nanoparticle core)/GaN (shell layer)/HDA (modified organic compound).

Figure 2:
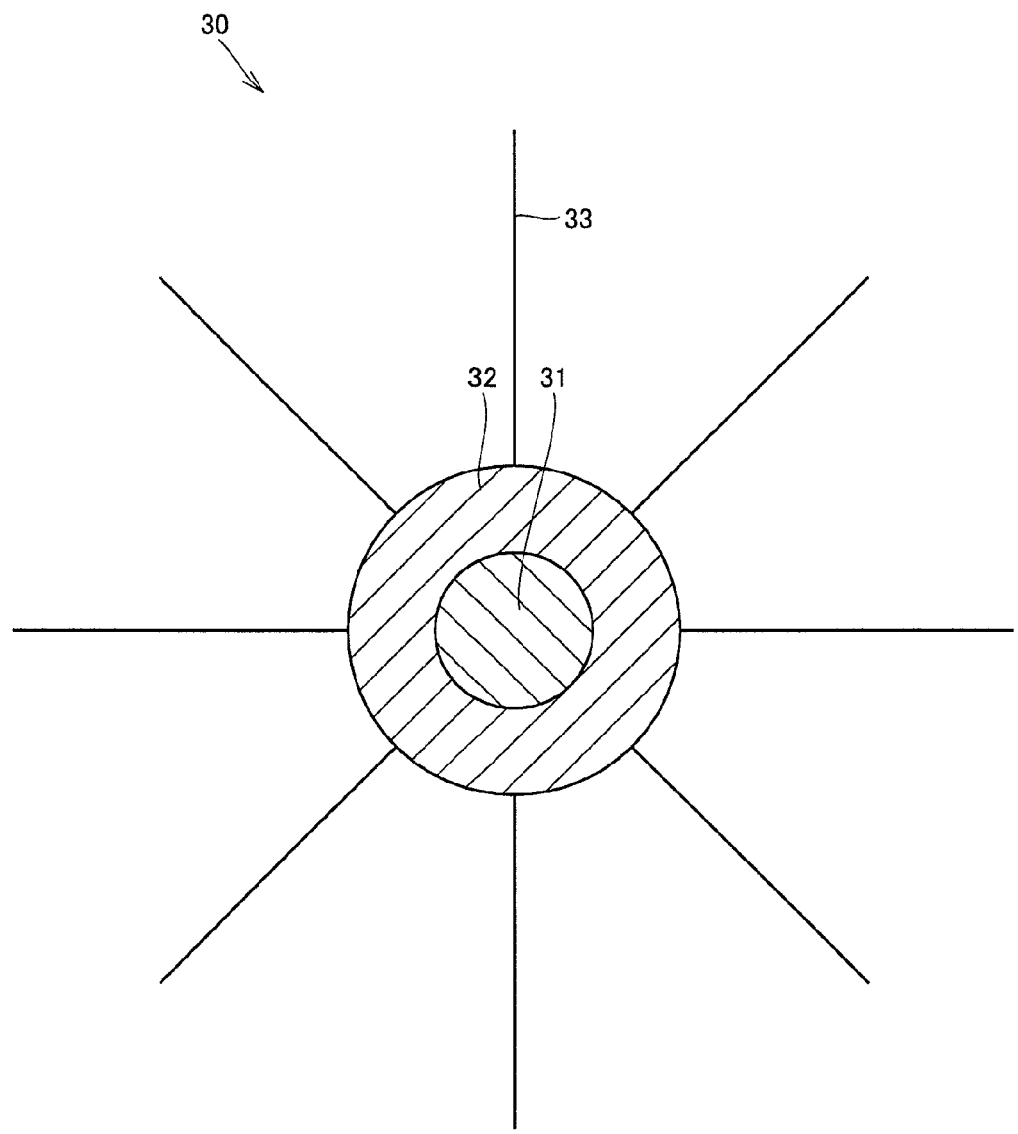
FIG. 2 is a section view schematically showing a basic structure of a semiconductor phosphor nanoparticle produced in Comparative Example 1.

FIG. 2 is a view schematically showing a basic structure of a semiconductor phosphor nanoparticle produced in Comparative Example 1.

In FIG. 2, a semiconductor phosphor nanoparticle 30 includes a nanoparticle core 31, a shell layer 32 coating nanoparticle core 31, and a modified organic compound 33 binding to a surface of shell layer 32. Modified organic compound 33 binds to a group 13 element of shell layer 32. In the semiconductor phosphor nanoparticle of Comparative Example 1, an InN crystal constituting the nanoparticle core absorbed luminescence at 405 nm and produced red luminescence having a luminous wavelength of 620 nm.

(Mean Particle Diameter)

X-ray diffraction measurement was conducted for semiconductor phosphor nanoparticles of Examples 1 to 11 and Comparative Example 1, and a mean particle diameter of nanoparticle cores was estimated from the obtained spectrum half-value width. For calculation of the mean particle diameter of nanoparticle cores, the following Scherrer's formula (Mathematical formula (2)) was used.

$$B = \lambda / \cos \theta \cdot R \qquad \text{(Mathematical formula (2))}$$

Here,
B: X-ray half-value width [deg]
$\lambda$: Wavelength of X-ray [nm]
$\theta$: Bragg angle [deg]
R: Particle diameter [nm].

Mean particle diameters of the semiconductor phosphor nanoparticles of Examples 1 to 11 and Comparative Example 1 were shown in Table 1. Characteristics (excitation light wavelength and luminous wavelength) of the semiconductor phosphor nanoparticles of Examples 1 to 11 and Comparative Example 1 were also shown in Table 1.

TABLE 1

| | Nanoparticle core (material) | Shell layer (material) | Metal-containing modified organic compound (material) | Modified organic compound (material) | Mean particle diameter of nanoparticle core (nm) | Excitation light wavelength (nm) | Luminous wavelength (nm) | Luminous intensity (a.u.) |
|---|---|---|---|---|---|---|---|---|
| Example 1 | InN | GaN | Gallium acetyl acetonate | Hexadecylamine | 5 | 405 | 620 | 80 |
| Example 2 | InN | GaN | Indium acetyl acetonate | Oleylamine | 4 | 405 | 520 | 80 |
| Example 3 | InN | GaN | Zinc undecylenate | Hexadecylamine | 3 | 405 | 470 | 75 |
| Example 4 | InN | ZnS | Zinc undecylenate | Hexadecylamine | 5 | 405 | 620 | 85 |
| Example 5 | $In_{0.3}Ga_{0.7}N$ | GaN | Gallium myristyl sulfate | Oleylamine | 5 | 405 | 480 | 80 |
| Example 6 | $In_{0.4}Ga_{0.6}N$ | ZnS | Gallium palmityl phosphate | Hexadecylamine | 5 | 405 | 520 | 85 |
| Example 7 | InP | GaN | Zinc lauryl sulfate | Oleylamine | 3 | 405 | 650 | 95 |
| Example 8 | InP | ZnS | Zinc undecylenate | Hexadecylamine | 2 | 405 | 520 | 100 |
| Example 9 | $In_{0.7}Ga_{0.3}P$ | GaN | Indium stearyl phosphate | Hexadecylamine | 3 | 405 | 600 | 90 |
| Example 10 | $In_{0.7}Ga_{0.3}P$ | ZnS | Indium myristyl sulfate | Oleylamine | 3 | 405 | 600 | 100 |
| Example 11 | InN | GaN/ZnS | Zinc undecylenate | Hexadecylamine | 5 | 405 | 620 | 90 |
| Comparative Example 1 | InN | GaN | — | Hexadecylamine | 5 | 405 | 620 | 40 |

(Luminous Intensity)

In each semiconductor phosphor nanoparticle of Examples 1 to 11 and Comparative Example 1, each semiconductor phosphor nanoparticle was irradiated with light at a wavelength of 405 nm using a fluorescence spectrophotometer available from HORIBA Ltd. (product of JOBIN YVON INC.). Then an intensity of light having a luminous wavelength shown in Table 1 of each semiconductor phosphor nanoparticle was measured. The result was shown in Table 1.

Referring to Table 1, a luminous intensity of light at a wavelength of 620 nm was measured for Example 1, and a high luminous intensity of about 80 a.u. (arbitrary unit) was measured. This has demonstrated that the semiconductor phosphor nanoparticle of Example 1 shows quantum size effect, and has a high luminous intensity. This is attributable to the fact that surface defects in the shell layer are reduced by coating the surface of the shell layer with a metal element identical to the metal element contained in the shell layer, namely with the metal-containing modified organic compound having gallium and the modified organic compound.

In the semiconductor phosphor nanoparticle of Example 2, a luminous intensity of light at a wavelength of 520 nm was measured, and a high luminous intensity of about 80 a.u. was measured. This has demonstrated that the semiconductor phosphor nanoparticle of Example 2 shows quantum size effect, and has a high luminous intensity. This is attributable to the fact that surface defects in the shell layer are reduced by coating the surface of the shell layer uniformly with the metal-containing modified organic compound and the modified organic compound.

In the semiconductor phosphor nanoparticle of Example 3, a luminous intensity of light at a wavelength of 470 nm was measured, and a high luminous intensity of about 75 a.u. was measured. This has demonstrated that the semiconductor phosphor nanoparticle of Example 3 shows quantum size effect, and has a high luminous intensity. This is attributable to the fact that surface defects in the shell layer are reduced by coating the surface of the shell layer uniformly with the metal-containing modified organic compound and the modified organic compound.

In the semiconductor phosphor nanoparticle of Example 4, a luminous intensity of light at a wavelength of 620 nm was measured, and a high luminous intensity of about 85 a.u. was measured. This has demonstrated that the semiconductor phosphor nanoparticle of Example 4 shows quantum size effect, and has a high luminous intensity. This is attributable to the fact that surface defects in the shell layer are reduced by coating the surface of the shell layer with a metal element identical to the metal element contained in the shell layer, namely with the metal-containing modified organic compound having zinc and the modified organic compound.

In the semiconductor phosphor nanoparticle of Example 5, a luminous intensity of light at a wavelength of 480 nm was measured, and a high luminous intensity of about 80 a.u. was measured. This has demonstrated that the semiconductor phosphor nanoparticle of Example 5 shows quantum size effect, and has a high luminous intensity. This is attributable to the fact that surface defects in the shell layer are reduced by coating the surface of the shell layer with a metal element identical to the metal element contained in the shell layer, namely with the metal-containing modified organic compound having gallium and the modified organic compound.

In the semiconductor phosphor nanoparticle of Example 6, a luminous intensity of light at a wavelength of 520 nm was measured, and a high luminous intensity of about 85 a.u. was measured. This has demonstrated that the semiconductor phosphor nanoparticle of Example 6 shows quantum size effect, and has a high luminous intensity. This is attributable to the fact that surface defects in the shell layer are reduced by coating the surface of the shell layer uniformly with the metal-containing modified organic compound and the modified organic compound.

In the semiconductor phosphor nanoparticle of Example 7, a luminous intensity of light at a wavelength of 650 nm was measured, and a high luminous intensity of about 95 a.u. was measured. This has demonstrated that the semiconductor phosphor nanoparticle of Example 7 shows quantum size effect, and has a high luminous intensity. This is attributable to the fact that surface defects in the shell layer are reduced by coating the surface of the shell layer uniformly with the metal-containing modified organic compound and the modified organic compound.

In the semiconductor phosphor nanoparticle of Example 8, a luminous intensity of light at a wavelength of 520 nm was measured, and a high luminous intensity of about 100 a.u. was measured. This has demonstrated that the semiconductor phosphor nanoparticle of Example 8 shows quantum size effect, and has a high luminous intensity. This is attributable to the fact that surface defects in the shell layer are reduced by coating the surface of the shell layer with a metal element identical to the metal element contained in the shell layer, namely with the metal-containing modified organic compound having zinc and the modified organic compound.

In the semiconductor phosphor nanoparticle of Example 9, a luminous intensity of light at a wavelength of 600 nm was measured, and a high luminous intensity of about 90 a.u. was measured. This has demonstrated that the semiconductor phosphor nanoparticle of Example 9 shows quantum size effect, and has a high luminous intensity. This is attributable to the fact that surface defects in the shell layer are reduced by coating the surface of the shell layer uniformly with the metal-containing modified organic compound and the modified organic compound.

In the semiconductor phosphor nanoparticle of Example 10, a luminous intensity of light at a wavelength of 600 nm was measured, and a high luminous intensity of about 100 a.u. was measured. This has demonstrated that the semiconductor phosphor nanoparticle of Example 10 shows quantum size effect, and has a high luminous intensity. This is attributable to the fact that surface defects in the shell layer are reduced by coating the surface of the shell layer uniformly with the metal-containing modified organic compound and the modified organic compound.

In the semiconductor phosphor nanoparticle of Example 11, a luminous intensity of light at a wavelength of 620 nm was measured, and a high luminous intensity of about 90 a.u. was measured. This has demonstrated that the semiconductor phosphor nanoparticle of Example 11 shows quantum size effect, and has a high luminous intensity. This is attributable to the fact that the nanoparticle core is effectively protected by the laminate structure of the shell layer, and that surface defects in the shell layer are reduced by coating the surface of the second shell that is an outer shell of the shell layer with a metal element identical to the metal element contained in the second shell, namely with the metal-containing modified organic compound having zinc and the modified organic compound.

In the semiconductor phosphor nanoparticle of Comparative Example 1, a luminous intensity of light at a wavelength of 620 nm was measured, and it was about 40 a.u.

Figure 3:
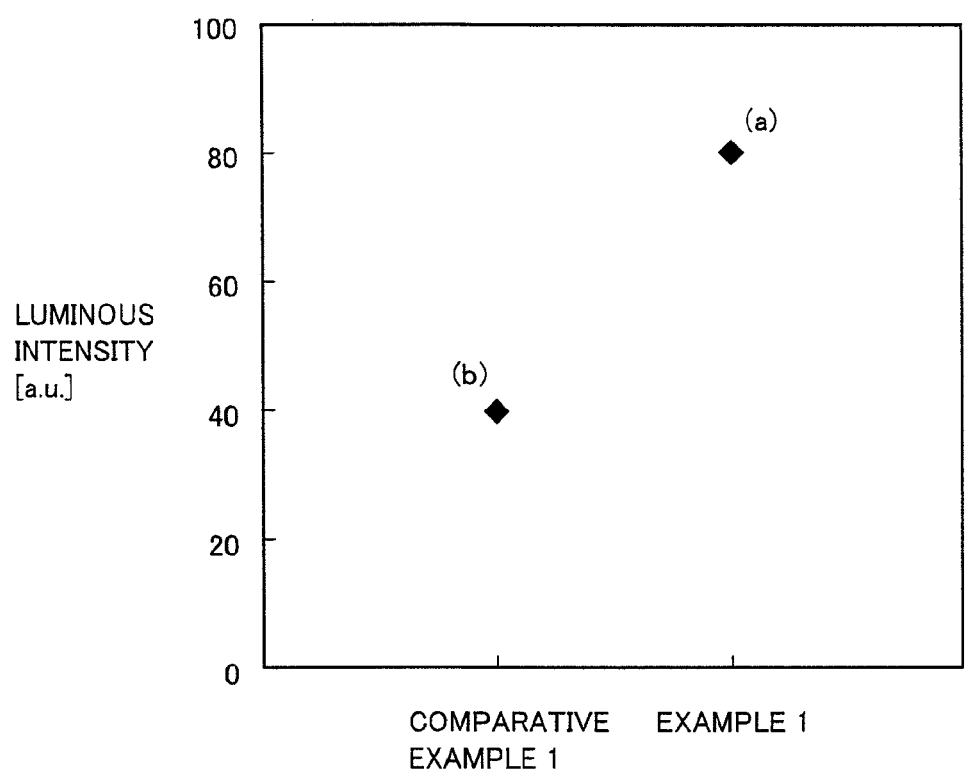
FIG. 3 is a graph showing respective luminous characteristics of semiconductor phosphor nanoparticles of Example 1 and Comparative Example 1.

FIG. 3 is a chart showing luminous characteristics of the semiconductor phosphor nanoparticles of Example 1 and Comparative Example 1. In the drawing, (a) represents the luminous intensity of the semiconductor phosphor nanoparticle of Example 1, and (b) represents the luminous intensity of the semiconductor phosphor nanoparticle of Comparative Example 1.

As shown also in FIG. 3, the semiconductor phosphor nanoparticle of Example 1 showed a higher luminous intensity than the semiconductor phosphor nanoparticle of Comparative Example 1. This has revealed that the semiconductor phosphor nanoparticle of Example 1 has a higher luminous efficiency than the semiconductor phosphor nanoparticle of Comparative Example 1. This also applies to Examples 2 to 11. This owes to the fact that protection of the surface defect in the phosphor obtained in Comparative Example 1 is not sufficient in comparison with the semiconductor phosphor nanoparticle of Example 1 because the surface of the shell layer is coated only with a surface modifying molecule.

Also in Examples 1 to 11, it has found that semiconductor phosphor nanoparticles do not aggregate, and have a uniform size, and exhibit high dispersibility. This is attributable to repulsion power generated between the metal-containing modified organic compound and the modified organic compound by uniformly coating the surface of the shell layer with the metal-containing modified organic compound and the modified organic compound, and to control of the particle diameter of the semiconductor phosphor nanoparticle by the metal-containing modified organic compound and the modified organic compound.

According to the present invention, since a semiconductor phosphor nanoparticle excellent in luminous efficiency and dispersibility can be provided, it may be suitably used, for example, for a blue LED or the like.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A semiconductor phosphor nanoparticle comprising:
a nanoparticle core made of a group 13-group 15 semiconductor;
a shell layer coating said nanoparticle core; and
a metal-containing modified organic compound and a modified organic compound binding to a surface of said shell layer,
wherein said metal-containing modified organic compound is a member selected from the group consisting of gallium acetyl acetonate, indium acetyl acetonate, gallium stearate, indium stearate, zinc stearate, gallium palmitate, indium palmitate, zinc palmitate, gallium myristate, indium myristate, zinc myristate, gallium laurate, indium laurate, zinc laurate, gallium undecylenate, indium undecylenate, zinc undecylenate, gallium stearyl sulfate, indium stearyl sulfate, gallium palmityl sulfate, indium palmityl sulfate, zinc palmityl sulfate, zinc stearyl sulfate, gallium myristyl sulfate, indium myristyl sulfate, zinc myristyl sulfate, gallium lauryl sulfate, indium lauryl sulfate, zinc lauryl sulfate, gallium stearyl phosphate, indium stearyl phosphate, zinc stearyl phosphate, gallium palmityl phosphate, indium palmityl phosphate, zinc palmityl phosphate, gallium myristyl phosphate, indium myristyl phosphate, zinc myristyl phosphate, gallium lauryl phosphate, indium lauryl phosphate, and zinc lauryl phosphate.

* * * * *